United States Patent
Gorski et al.

(10) Patent No.: US 11,203,082 B2
(45) Date of Patent: Dec. 21, 2021

(54) CAM ASSEMBLY IN A LINEAR FRICTION WELDER SYSTEM

(71) Applicant: APCI, LLC, South Bend, IN (US)

(72) Inventors: Thaddeus W. Gorski, Hann, IN (US); Stephen A. Johnson, South Bend, IN (US)

(73) Assignee: APCI LLC, South Bend, IN (US)

( * ) Notice: Subject to any disclaimer, the term of this patent is extended or adjusted under 35 U.S.C. 154(b) by 0 days.

(21) Appl. No.: 16/922,624

(22) Filed: Jul. 7, 2020

(65) Prior Publication Data

US 2020/0331093 A1 Oct. 22, 2020

Related U.S. Application Data

(62) Division of application No. 16/136,020, filed on Sep. 19, 2018, now Pat. No. 10,737,353.

(51) Int. Cl.
*B23K 20/12* (2006.01)
*B29C 65/06* (2006.01)

(52) U.S. Cl.
CPC ...... *B23K 20/1205* (2013.01); *B29C 65/0618* (2013.01)

(58) Field of Classification Search
CPC ...... B23K 20/1205; B23K 20/12–1215; B23K 20/1285–1295; B29C 65/0618; B29C 65/06–069
USPC .............................. 228/112.1–114.5, 2.1–2.3
See application file for complete search history.

(56) References Cited

U.S. PATENT DOCUMENTS

| | | | |
|---|---|---|---|
| 3,058,513 A | 10/1962 | Schaub et al. | |
| 3,235,162 A * | 2/1966 | Hollander | B23K 20/12 228/113 |
| 3,377,009 A * | 4/1968 | Lipp | B23K 20/12 228/2.3 |
| 3,388,849 A | 6/1968 | Blum et al. | |
| 3,455,494 A * | 7/1969 | Stamm | B23K 20/12 228/2.3 |
| 3,542,275 A * | 11/1970 | Loyd | B23K 20/1205 228/2.1 |
| 3,554,845 A | 1/1971 | Billett et al. | |

(Continued)

FOREIGN PATENT DOCUMENTS

| | | |
|---|---|---|
| DE | 102004016613 A1 | 11/2005 |
| EP | 0355867 A1 | 2/1990 |

(Continued)

OTHER PUBLICATIONS

Thompson Friction Welding, "Linear Friction Welding Becomes a Commercial Reality," Article, West Midlands, United Kingdom, Feb. 2008 (5 pages).

(Continued)

*Primary Examiner* — Kiley S Stoner
(74) *Attorney, Agent, or Firm* — Maginot, Moore & Beck LLP (57) ABSTRACT

A cam assembly in a linear friction welding system includes two power shafts. Each of the shafts have two timing gears mounted thereupon. For one of the shafts, one of the timing gears includes a slot extending within the timing gear which is formed as an arc about a center of rotation of the power shaft. The other timing gear on that shaft includes a fixed pin which extends into the slot. A cross-over shaft is operably connected to both power shafts.

10 Claims, 7 Drawing Sheets

(56) References Cited

U.S. PATENT DOCUMENTS

| | | | |
|---|---|---|---|
| 3,591,068 A | 7/1971 | Farmer et al. | |
| 3,613,983 A * | 10/1971 | Gage | B23Q 3/066 |
| | | | 228/2.3 |
| 3,671,049 A | 6/1972 | Stamm | |
| 3,680,760 A * | 8/1972 | Costa | B23K 20/121 |
| | | | 228/2.3 |
| 3,701,708 A | 10/1972 | Brown et al. | |
| 3,791,569 A | 2/1974 | Mims | |
| 3,822,821 A | 7/1974 | Clarke | |
| 3,848,792 A | 11/1974 | Mims | |
| 3,860,468 A | 1/1975 | Scherer | |
| 3,920,504 A | 11/1975 | Shoh et al. | |
| 3,972,465 A | 8/1976 | Takaoka et al. | |
| 4,043,497 A | 8/1977 | Jones | |
| 4,087,036 A | 5/1978 | Corbett et al. | |
| 4,154,641 A | 5/1979 | Hotton | |
| 4,247,346 A | 1/1981 | Maehara et al. | |
| 4,270,495 A | 6/1981 | Freudenstein et al. | |
| 4,470,868 A | 9/1984 | MacLaughlin et al. | |
| 4,552,609 A | 11/1985 | Larsen | |
| 4,811,887 A | 3/1989 | King et al. | |
| 4,858,815 A | 8/1989 | Roberts et al. | |
| 4,905,883 A | 3/1990 | Searle | |
| 4,995,544 A | 2/1991 | Searle | |
| 5,100,044 A | 3/1992 | Searle | |
| 5,141,591 A | 8/1992 | Boek et al. | |
| 5,248,077 A | 9/1993 | Rhoades et al. | |
| 5,366,344 A | 11/1994 | Gillbanks et al. | |
| 5,849,146 A | 12/1998 | Searle et al. | |
| 5,853,119 A | 12/1998 | Searle | |
| 6,003,752 A | 12/1999 | Searle et al. | |
| 6,102,272 A | 8/2000 | Searle et al. | |
| 6,145,730 A | 11/2000 | Wiesemann | |
| 6,328,087 B1 | 12/2001 | Finzo et al. | |
| 6,354,482 B1 * | 3/2002 | Diebold | B23K 20/129 |
| | | | 156/580.2 |
| 6,357,506 B1 | 3/2002 | Nomura et al. | |
| 6,491,785 B1 | 12/2002 | Sato et al. | |
| 6,688,512 B2 | 2/2004 | Trask | |
| 6,779,708 B2 | 8/2004 | Slattery | |
| 7,882,996 B2 | 2/2011 | Alessi et al. | |
| 8,070,039 B1 * | 12/2011 | Johnson | B23K 20/1205 |
| | | | 228/2.1 |
| 8,181,841 B2 | 5/2012 | Johnson et al. | |
| 8,376,210 B2 | 2/2013 | Johnson et al. | |
| 8,967,216 B2 | 3/2015 | Johnson | |
| 2002/0185208 A1 | 12/2002 | Brooks | |
| 2004/0216432 A1 | 11/2004 | Lopez | |
| 2004/0256439 A1 | 12/2004 | Pfeiler | |
| 2006/0113358 A1 | 6/2006 | Crasser | |
| 2006/0220599 A1 * | 10/2006 | Siegler | B29C 66/71 |
| | | | 318/114 |
| 2006/0231593 A1 | 10/2006 | Bayer et al. | |
| 2009/0145948 A1 | 6/2009 | Pfeiler | |
| 2009/0321497 A1 | 12/2009 | Alessi et al. | |
| 2011/0056629 A1 | 3/2011 | Kawaura et al. | |
| 2012/0216938 A1 | 8/2012 | Johnson et al. | |
| 2013/0139968 A1 * | 6/2013 | Johnson | B23K 20/1205 |
| | | | 156/350 |
| 2013/0255619 A1 | 10/2013 | Mizuno et al. | |
| 2014/0326414 A1 * | 11/2014 | Johnson | B23K 20/1205 |
| | | | 156/580 |
| 2014/0338841 A1 * | 11/2014 | Johnson | B23K 20/10 |
| | | | 156/580.1 |
| 2017/0036298 A1 * | 2/2017 | Johnson | B23K 20/1205 |
| 2019/0315068 A1 | 10/2019 | Lotz | |
| 2020/0086421 A1 * | 3/2020 | Johnson | B23K 20/121 |

FOREIGN PATENT DOCUMENTS

| | | | | |
|---|---|---|---|---|
| EP | 0999133 A1 | | 5/2000 | |
| GB | 1332712 | | 10/1973 | |
| JP | 01118386 A | * | 5/1989 | B23K 20/1205 |
| JP | 2002153975 A | | 5/2002 | |
| JP | 2009298411 A | | 12/2009 | |

OTHER PUBLICATIONS

TWI Knowledge Summary website page "Linear Friction Welding," by Philip Threadgill, http://www.twi.co.uk/content/ksplt001.html; published at least as early as Oct. 21, 2009 (3 pages).
Addison, "Linear Friction Welding of Engineering Materials," Research Report © TWI Ltd., Feb. 2008, United Kingdom (34 pages).
Addison, "Linear Friction Welding Information for Production Engineering," Research Report © TWI Ltd. Jul. 2010, United Kingdom (46 pages).
International Search Report corresponding to PCT application PCT/US2012/067389, dated Feb. 7, 2013 (2 pages).
International Search Report corresponding to PCT application PCT/US2011/048785, dated Dec. 8, 2011 (4 pages).
International Search Report corresponding to PCT application PCT/US2012/067840, dated Feb. 8, 2013 (2 pages).

* cited by examiner

FIG. 10 ns to begin to plasticize. Once the two components are
CAM ASSEMBLY IN A LINEAR FRICTION WELDER SYSTEM This application is a divisional application of U.S. application Ser. No. 16/136,020, filed on Sep. 19, 2018, the disclosure of which is incorporated herein by reference in its entirety.

The present disclosure relates to linear friction welding.

BACKGROUND

Friction welding (FW) is a process of joining two components which may be made from the same or different materials. The FW process typically involves pressing one of the two components against the other component with a large amount of force and rapidly moving one of the two components with respect to the other component to generate friction at the interface of the two components. The pressure and movement generate sufficient heat to cause the components to begin to plasticize. Once the two components are plasticized at the contact interface, the relative movement of the two components is terminated and an increased force is applied. As the components cool in this static condition, a weld is formed at the contact interface.

The weld obtained using FW is a solid state bond which is highly repeatable and easily verifiable. For example, the amount of material donated by each component to the formation of the weld, which is referred to as "upset", is well defined. Therefore, by carefully controlling the energy input into the FW system in the form of friction and forging pressure, the measured upset of a welded assembly provides verification as to the nature of the weld obtained.

As discussed above, relative movement of the two components is a critical facet of FW. Different approaches have been developed to provide the required relative movement. One widely used approach is rotational friction welding (RFW). RFW involves rotation of one component about a weld axis. RFW provides many benefits and is thus a favored welding approach in various industries including aerospace and energy industries.

RFW, however, does have some limitations. For example, in forming a weld, the interface between the two components must be evenly heated to generate a uniform plasticity within each of the components throughout the weld interface. If one area becomes hotter than another area, the material in that hotter area will be softer, resulting in an incongruity in the formed weld. To provide consistent heat generation throughout the component interface, the rotated component is necessarily uniformly shaped about the axis of rotation, i.e., circular. Moreover, since the heat generated is a function of the relative speed between the two materials, more heat will be generated toward the periphery of the rotated component since the relative speed at the periphery is higher than the relative speed at the rotational axis.

In response to the limitations of RFW, linear friction welding (LFW) was developed. In LFW, the relative movement is modified from a rotational movement to a vibratory/oscillatory movement along a welding axis. By controlling the amplitude and the frequency of the linear movement, the heat generated at the component interface can be controlled.

LFW thus allows for welding of a component that exhibits substantially uniform width. LFW, like RFW, is subject to various limitations. One such limitation is that in order to achieve the frequency and amplitude necessary to realize a weld, a LFW device must provide for rapid acceleration from a dead stop. The moving component must then be completely stopped and reaccelerated in a reverse direction. As the size of the vibrated component increases, the momentum that must be controlled becomes problematic. Thus, traditional LFW devices incorporate massive components which are very expensive.

In response to limitations in LFW devices, U.S. Pat. No. 8,070,039, which issued Dec. 6, 2011 disclosed a LFW device with two power shafts. The phasing of the two power shafts in the '039 patent, the entire content of which is herein incorporated by reference, is controlled in order to generate an oscillatory movement of a ram which forces movement between two workpieces which are forced together by a pressing assembly. The '039 patent discloses the use of independent motors whose speed is specifically controlled in order to establish the desired phasing of the shafts.

A LFW system and method which provides consistent welds would be beneficial. A LFW system and method which allows for smaller components within the system would be further beneficial. A LFW system and method which reduce the complexity in motor control associated with the LFW process would be further beneficial.

SUMMARY

The present disclosure in one embodiment is a linear friction welding system including a ram configured to oscillate along a welding axis and two power shafts operably connectable to the ram through a vibrating assembly. One motor is configured to drive a first power timing gear, the first power timing gear fixedly connected to the first power shaft, and a second motor is configured to drive a second power timing gear, the second power timing gear fixedly connected to the second power shaft. A first slave timing gear is operably connected to the first power shaft and the second power shaft, the slave timing gear in fixed rotational relationship to the second power shaft, and in variable rotational relationship with the first power shaft. The first slave timing gear is configured to be driven by the first power shaft in a first configuration, and configured to be driven by the second power shaft in a second configuration, wherein in one of the first and second configuration, the first and second power shafts are operably connected to the ram through the vibrating assembly, and in the other of the first and second configuration, the first and second power shafts are not operably connected to the ram through the vibrating assembly.

In one or more embodiments the first slave timing gear is supported by, and rotatable with respect to, the first power shaft.

In one or more embodiments the linear friction welding system further includes a slot extending within one of the first slave timing gear and the first power timing gear, and a pin fixedly connected to the other of the first slave timing gear and the first power timing gear, the pin extending into the slot.

In one or more embodiments the slot and pin are configured such that in the one of the first and second configuration the pin abuts a first end of the slot and the first power shaft and the second power shaft are oriented by the abutment of the pin with the first end of the slot to establish a maximum system phase angle. The slot and pin are further configured such that in the other of the first and second configuration the pin abuts a second end of the slot and the first power shaft and the second power shaft are oriented by the abutment of the pin with the second end of the slot to establish a system phase angle of zero.

In one or more embodiments a friction welding system includes a slot shim, the slot shim configured to be removably attached to the one of the first slave timing gear and the first power timing gear, and including body portion configured to fit within the slot so as to establish a desired length of the slot, the desired length of the slot associated with a desired oscillation amplitude of the ram.

In one or more embodiments a welding control system is operably connected to the motors, and a hydraulic press. The welding control system includes a memory, program instructions stored within the memory, a parameter database stored within the memory, and a processing circuit operably connected to the memory and configured to execute the program instructions. The welding control system controls one of the motors to establish a zero system phase configuration, while controlling the other motor using a torque control setting to establish a non-zero system phase configuration which forces the ram to oscillate. The welding control system further controls a system hydraulic press to conduct a linear friction welding process.

In one or more embodiments, the linear friction welding system includes a second slave timing belt fixedly attached to the second power shaft and a cross-over shaft operably connected to the first slave timing gear and the second slave timing gear.

In one or more embodiments the processing circuit is operably connected to the memory and configured to execute the program instructions to control the second motor using a speed control and to control the first motor using a torque follower control.

In one embodiment a method is used to operate a linear friction welding system including (i) a ram configured to oscillate along a welding axis, (ii) a first power shaft operably connectable to the ram through a vibrating assembly, (iii) a second power shaft operably connectable to the ram through the vibrating assembly, (iv) a first motor configured to drive a first power timing gear, the first power timing gear fixedly connected to the first power shaft, (v) a second motor configured to drive a second power timing gear, the second power timing gear fixedly connected to the second power shaft, and (vi) a first slave timing gear operably connected to the first and second power shaft, the slave timing gear in fixed rotational relationship to the second power shaft, and in variable rotational relationship with the first power shaft. The method includes controlling the second motor to drive the first slave timing gear thereby rotating the first power shaft and the second power shaft without oscillating the ram, and bringing two components to be welded into contact after controlling the second motor to drive the first slave timing gear. The method continues with controlling the first motor to drive the first slave timing gear thereby operably connecting the first power shaft and the second power shaft to the ram through the vibrating assembly causing the ram to oscillate along the welding axis after the two components to be welded are brought into contact. To stop oscillation of the ram, control is switched from the first motor to the second motor. The method further includes establishing a forge pressure between the two components after switching control from the first motor to the second motor.

In one or more embodiments, controlling the second motor to drive the first slave timing gear includes rotating the first slave timing gear on the first power shaft with the second motor.

In one or more embodiments, controlling the second motor to drive the first slave timing gear includes transferring force between a slot extending within one of the first slave timing gear and the first power timing gear, and a pin fixedly connected to the other of the first slave timing gear and the first power timing gear.

In one or more embodiments controlling the first motor to drive the first slave timing gear includes transferring force between a slot shim positioned within the slot and the pin.

The above described features and advantages, as well as others, will become more readily apparent to those of ordinary skill in the art by reference to the following detailed description and accompanying drawings.

BRIEF DESCRIPTION OF THE DRAWINGS

The present disclosure may take form in various system and method components and arrangement of system and method components. The drawings are only for purposes of illustrating exemplary embodiments and are not to be construed as limiting the disclosure.

DETAILED DESCRIPTION

Figure 1:
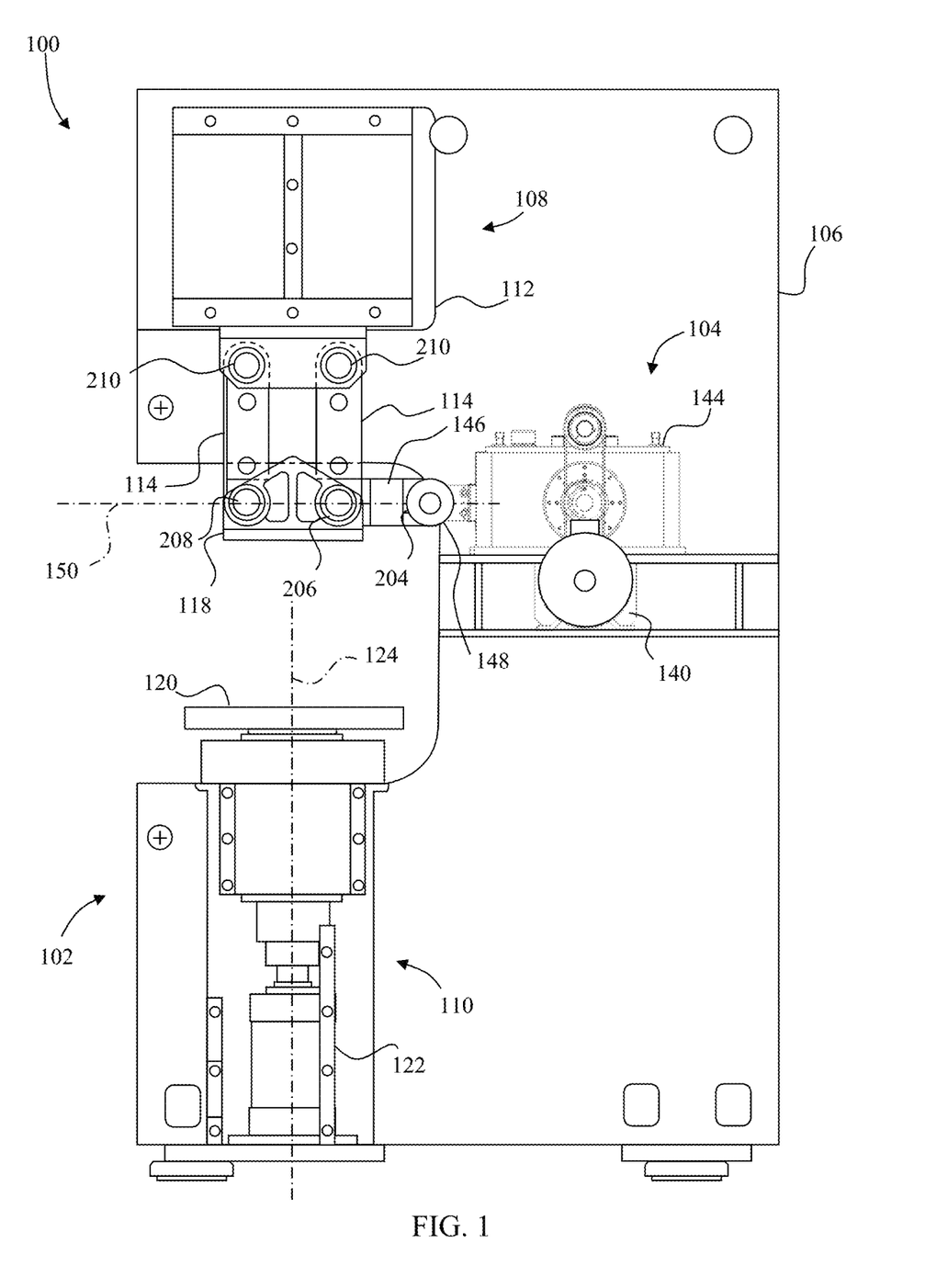
FIG. 1 depicts a partial side plan view of a linear friction welding system in accordance with principles of the disclosure.

Referring to FIG. 1, a linear friction welding system 100 includes a pressing assembly 102 and a vibrating assembly 104 positioned within a frame 106. The pressing assembly 102 includes an upper assembly 108 and a lower assembly 110. The upper assembly includes a base 112, and two rocker arm pairs 114 and 116 supporting a carriage 118 as further shown in FIG. 2 wherein the vibrating assembly 104 is removed for clarity.

Figure 2:
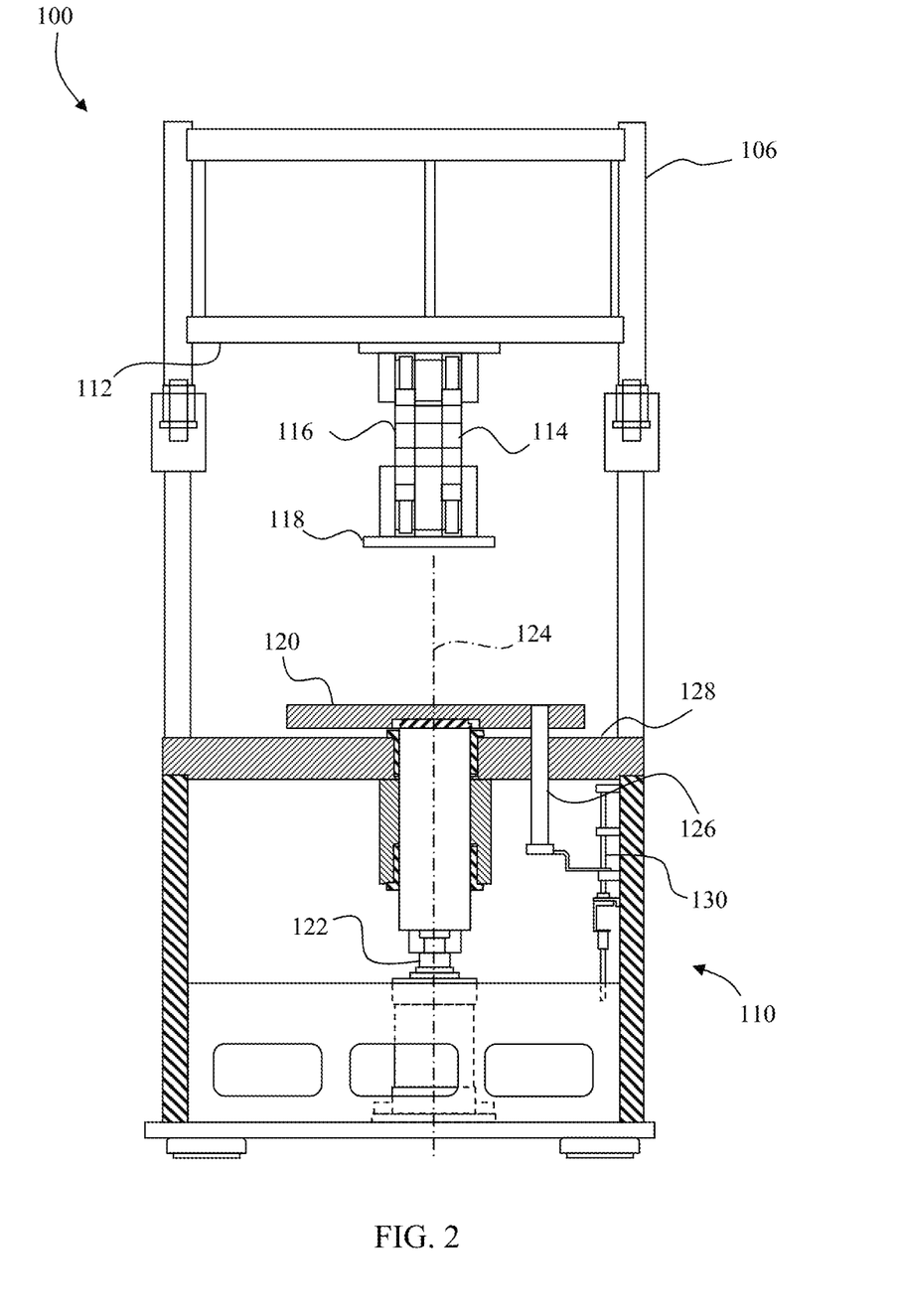
FIG. 2 depicts a partial front cross-sectional view of the system of FIG. 1.

Continuing with FIG. 2, the lower assembly 110 is generally aligned with the carriage 118 and includes a forge platen 120 supported above a main hydraulic press 122. The main hydraulic press 122 defines a press axis 124. An anti-rotation rod 126 extends from the forge platen 120 through a lower support plate 128. A sensor 130 is associated with the anti-rotation rod 126. In one embodiment, the sensor 130 is a linear voltage displacement transducer (LVDT).

Figure 3:
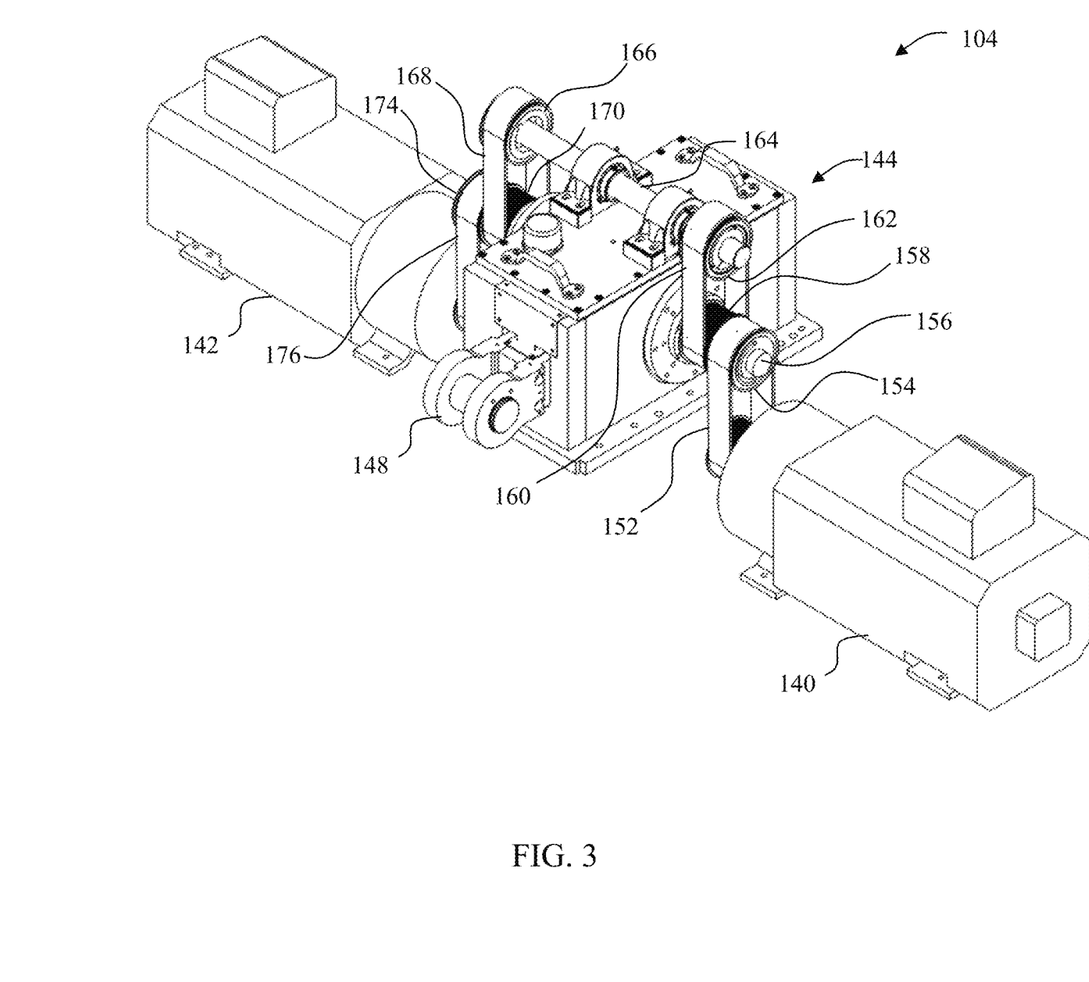
FIG. 3 depicts a top perspective view of the vibrating assembly of FIG. 1.
Figure 4:
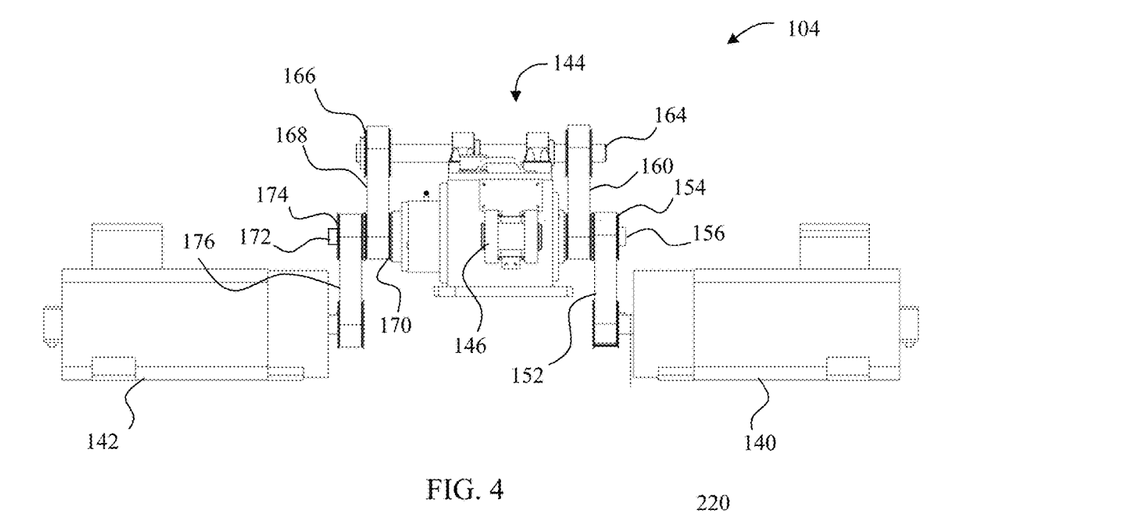
FIG. 4 depicts a front plan view of the of the vibrating assembly of FIG. 1.

Referring to FIGS. 1, 3, and 4, the vibrating assembly 104 includes a motor 140, a motor 142, a cam assembly 144, and a ram 146. The ram 146 is pivotably connected to the carriage 118 at a forward end and is pivotably connected to the cam assembly 144 at the opposite end through a connecting rod 148. The ram 146 is configured for movement along a weld axis 150 (see FIG. 1).

The motor 140 drives a first power timing belt 152 which is operably connected to a first power timing gear 154 which is fixedly supported on an outer power shaft 156 of the cam assembly 144. A slave timing gear 158 is rotatably supported on the outer power shaft 156 and connected by a first slave timing belt 160 to a first cross-over timing gear 162. The first cross-over timing gear 162 is fixedly connected to a cross-over shaft 164 to which a second cross-over timing gear 166 is fixedly connected. A second slave timing belt 168 connects the second cross-over timing gear 166 to a second slave timing gear 170 which is fixedly supported by an inner power shaft 172. A second power timing gear 174 is fixedly supported by the inner power shaft 172 and is operably connected to the motor 142 through a second power timing belt 176.

Figure 5:
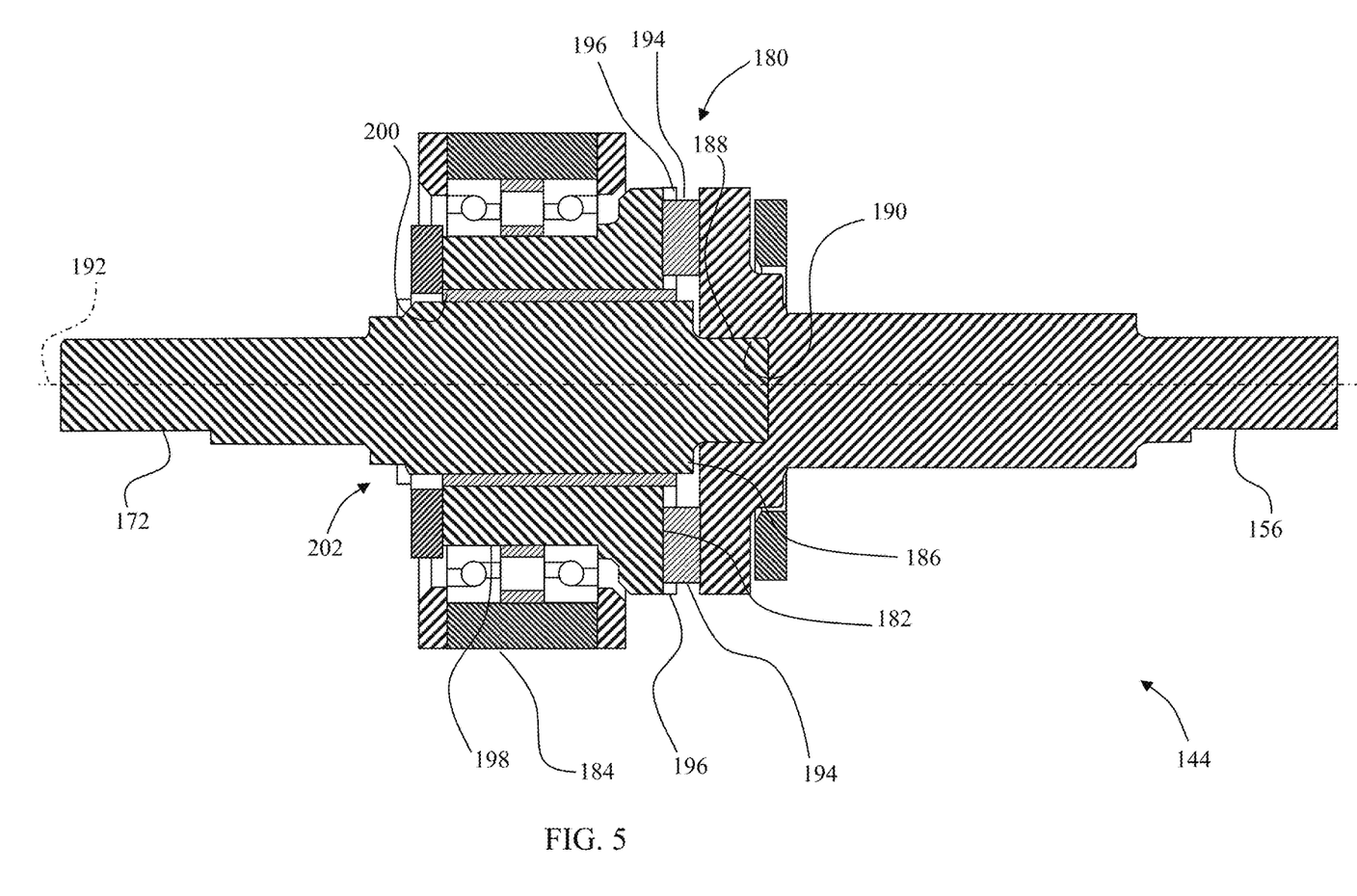
FIG. 5 depicts a simplified partial cross-sectional view of the vibrating assembly of FIG. 1 depicting an eccentric portion of an inner power shaft positioned within an eccentric, with an eccentric outer surface and an outer power shaft engaged with the eccentric.

The cam assembly 144, shown in more detail in FIG. 5, includes the inner power shaft 172, the outer power shaft 156, a coupler 180, an eccentric 182, and a cam follower 184. The inner power shaft 172 includes an eccentric portion 186 and a projection 188. The outer power shaft 156 includes a cavity 190 configured to rotatably receive the projection 188. Rotatable engagement of the projection 188 within the cavity 190 keeps both the inner and outer power shafts 172/156 coaxial with an axis of rotation 192.

The coupler 180 is a modified Oldham coupler including one bifurcated tongue 194 which mates with a groove 196 in the eccentric 182 and a second bifurcated tongue (not shown), rotated ninety degrees with respect to the bifurcated tongue 194, which mates with a groove (not shown) in the inner power shaft 172. The eccentric 182 further includes an outer eccentric periphery 198 and an inner periphery 200 defining a through-bore 202. The bore 202 is sized to rotationally receive the eccentric portion 186 of the inner power shaft 172. The outer eccentric periphery 198 defines a diameter that is closely fit within the inner diameter of the cam follower 184.

The connecting rod 148 of the cam assembly 144 is pivotably connected to the ram 146 through a pivot 204 (see FIG. 1). The ram 146 is in turn pivotably connected to the carriage 118 through a lower pivot pair 206 (only one is shown in FIG. 1). The lower pivot pair 206 also pivotably connects the carriage 118 with a rearward rocker arm of each of the rocker arm pairs 114 and 116. Another lower pivot pair 208 (only one is shown in FIG. 1) pivotably connects the carriage 118 with a forward rocker arm of each of the rocker arm pairs 114 and 116. Four pivots 210 pivotably connect each of the rocker arms in the rocker arm pairs 114 and 116 to the base 112.

Figure 6:
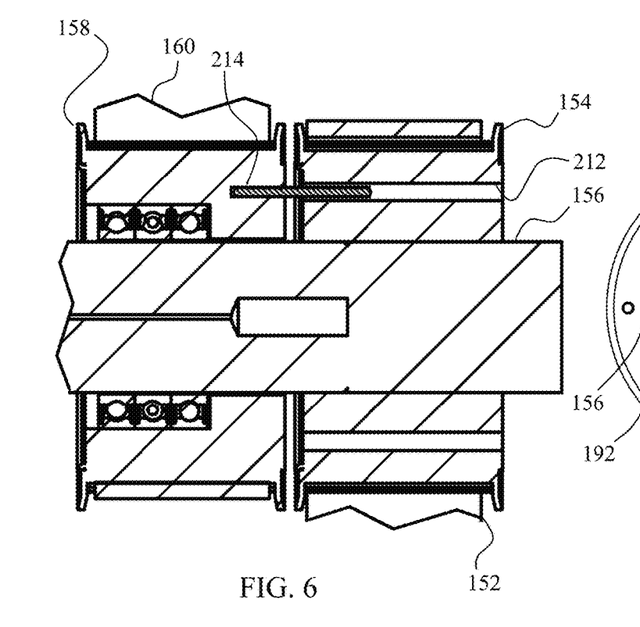
FIG. 6 depicts a partial view of a power timing gear and a slave timing gear of the vibrating assembly of FIG. 4.

As noted above, the slave timing gear 158 is rotatably supported on the outer power shaft 156. The slave timing gear 158 is further operably connected to the first power timing gear 154 as discussed with reference to FIGS. 6 and 7. The first power timing gear 154 includes a slot 212 which extends in an arc partially about the axis of rotation 192. The axis of rotation 192 is the origin of the arc defined by the slot 212. A pin 214 is fixedly attached to the first slave timing gear 158 and extends into the slot 212. The pin 214 is movable within the sot 212 between a trail position 216 and a lead position 218. In the trail position 216 the pin 214 abuts one end of the slot 212 and in the lead position 218 the pin 214 abuts the opposite end of the slot 212.

Figure 8:
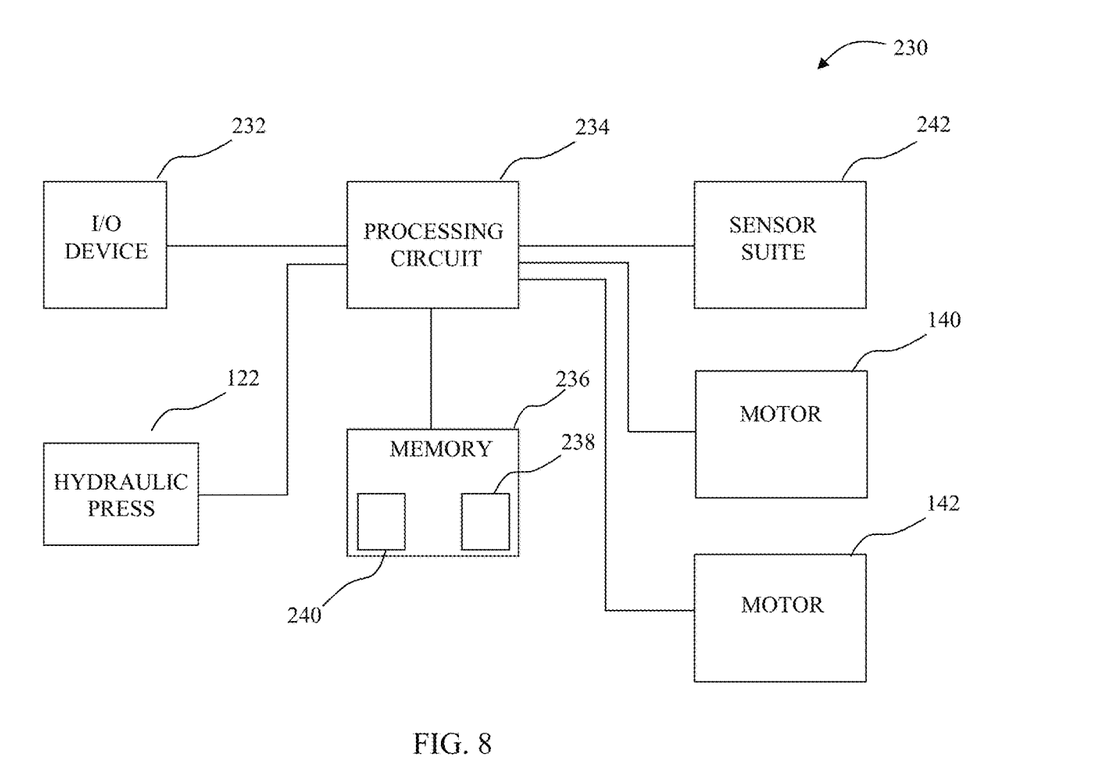
FIG. 8 depicts a schematic view of a control system of the linear friction welding system of FIG. 1.

The linear friction welding system 100 also includes a welding control system 230 depicted in FIG. 8. The control system 230 includes an I/O device 232, a processing circuit 234 and a memory 236. Program instructions 238 and parameter databases 240 are stored within the memory 236. The control system 230 is operably connected to the main hydraulic press 122, the motor 140, the motor 142, and a sensor suite 242 which includes the sensor 130. In some embodiments, one or more of the components of the system 230 are provided as a separate device which may be remotely located from the other components of the system 230.

The I/O device 232 in some embodiments includes a user interface, graphical user interface, keyboards, pointing devices, remote and/or local communication links, displays, and other devices that allow externally generated information to be provided to the control system 230, and that allow internal information of the control system 230 to be communicated externally.

The processing circuit 234 may suitably be a general purpose computer processing circuit such as a microprocessor and its associated circuitry. The processing circuit 234 is operable to carry out the operations attributed to it herein. The program instructions 238, some of which are described more fully below, are executable by the processing circuit 234 and/or any other components of the control system 230 as appropriate.

Many components in the above described linear friction welding system 100 are similar to, and work in like manner as, components in the system described in detail in the '039 patent. By way of example, when the inner power shaft 172 has the same relative rotational position as the outer power shaft 156, the relative phase of the inner power shaft 172 and the outer power shaft 156 are said to be matched, which may alternatively be referred to as being in phase, having the same relative phase, or having a system phase angle of zero. With a system phase angle of zero, and with the motors 140 and 142 operating, the ram 146 remains motionless. Movement of the ram 146 along the weld axis 150 is effected by controlling the motors 140 and 142 to establish a non-zero phase angle. As explained in more detail in the '039 patent, when a non-zero phase angle is established, the ram will oscillate at a frequency established by the rotational speed of the motors 140/142 and the amplitude of the oscillation is dictated by the system phase angle.

The linear friction welding system 100 differs from the system disclosed in the '039 patent, however, in the manner in which the system phase angle is established. This difference is realized by a torque based control of at least one of the motors. Initially, the torque for the motor 142 is set to the torque required to rotate the inner power shaft 172 at the desired speed for a particular welding operation. Alternatively, the motor 142 is controlled using a speed control approach. In one embodiment, control values for various torques/speeds used by the control system 230 are stored in the parameter databases 240. Specific values are provided for torques/speeds associated with different welding stages as well as different materials.

Returning to FIG. 4, as the motor 142 rotates the inner power shaft 172 through the second power timing belt 176 and the second power gear 174, the inner power shaft 172 rotates the second slave timing belt 168 through the second slave timing gear 170. Rotation of the second slave timing belt 168 causes the second cross-over timing gear to rotate resulting in rotation of the cross-over shaft 164.

Figure 7:
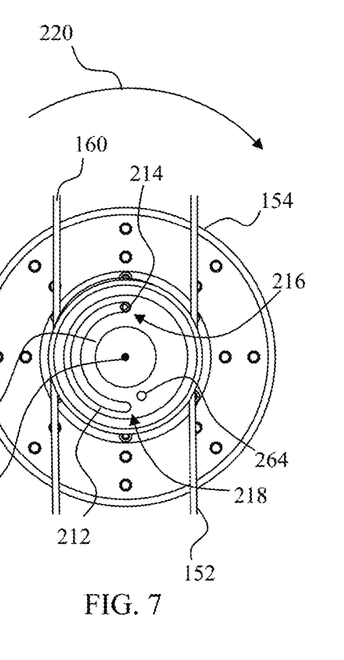
FIG. 7 depicts a side plan view of the power timing gear of FIG. 6.

As the cross-over shaft 164 rotates, the first cross-over timing gear 162 rotates the first slave timing gear 158 by rotation of the first slave timing belt 160. Because the motor 140 is not yet controlled, or is controlled to provide a lower torque than the motor 142, the first slave timing gear 158 rotates upon the outer power shaft 156. Accordingly, the pin 214 moves within the slot 212 to the trail position 216 against the end of the slot 212 as shown in FIG. 7. Once the pin 214 is in the trail position 216, the first power timing gear 154 is rotated in the clockwise direction (see arrow 250 of FIG. 7) thereby rotating the outer power shaft 156 and the motor 140 (through the first power timing belt 152) at the speed desired for the welding operation. The motor 140 thus operates as a load to the motor 142 in some embodiments.

The eccentric 186 and the slot 212 are configured such that when the pin 214 is positioned against the end of the slot in the trailing position 216, the system phase angle is zero. Consequently, there is no ram movement. Accordingly, a desired pressure can be established with no movement of the ram 146 as discussed in the '039 patent.

Once the desired pressure is established, vibration of the ram 146 is initiated by controlling the torque provided by the motor 142. The torque of the motor 142 is set according to the desired speed for the operation (e.g., scrub, burn) or by shifting torque allocation from the motor 142 to the motor 140. Switching torque control to the motor 142 causes the outer power shaft 156 to move faster relative to the inner power shaft 172. Accordingly, the first power gear 154 rotates faster than the first slave timing gear 158 resulting in relative movement of the first power gear 154 with respect to the pin 214 in the direction of the arrow 220 of FIG. 7. The slot 212 thus rotates in the direction of the arrow 220 until the pin 214 comes into contact with the end of the slot 212 in the lead position 218. At this point, the motor 140 becomes a load to the motor 142 and the motor 142 drives the inner shaft 172 at the speed associated with the torque set for the motor 142.

Movement of the slot 212 with respect to the pin 214 is reflected in rotation of the outer shaft 156 with respect to the inner shaft 172. Thus, a non-zero system angle is established and the ram 146 begins to oscillate.

Figure 9:
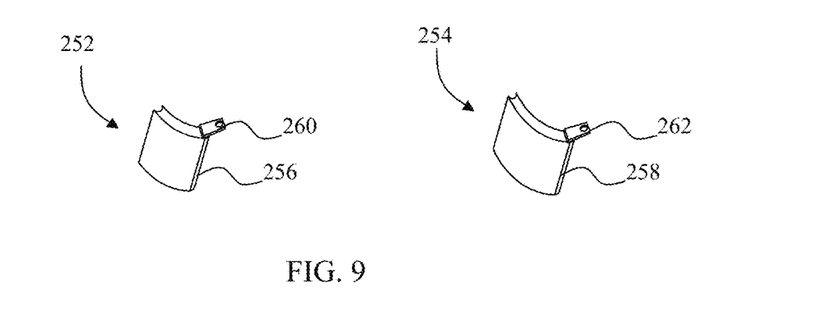
FIG. 9 depicts a top perspective view of slot shims for the system of FIG. 1.

The configuration of the eccentric 182 in combination with the location of the end of the slot 212 thus set the amplitude of the oscillation. Different material/component combinations, however, will typically require different amplitudes. Thus, in order to provide for modification of the amplitude for use with different materials/components while still using the system 100, a kit of one or more slot shims such as the slot shims 252 and 254 of FIG. 9 is provided in some embodiments. Each of the slot shims 252 and 254 include a respective body 256/258 and fastening tab 260/262. The bodies 256/258 are sized to fit within the slot 212.

Accordingly, to reduce the amplitude of the system 100 from the amplitude established by the eccentric 182 and the slot 212, a slot shim with the desired arc length is selected and inserted into the slot 212. A fastener (not shown) is used along with, e.g., the threaded bore 264 (see FIG. 7) in the first power timing gear 154, to fasten the selected slot shim in the slot 212. In systems including slot shims, a slot shim parameter may be used as an input to the control system 230 to verify the correct amplitude is selected.

Figure 10:
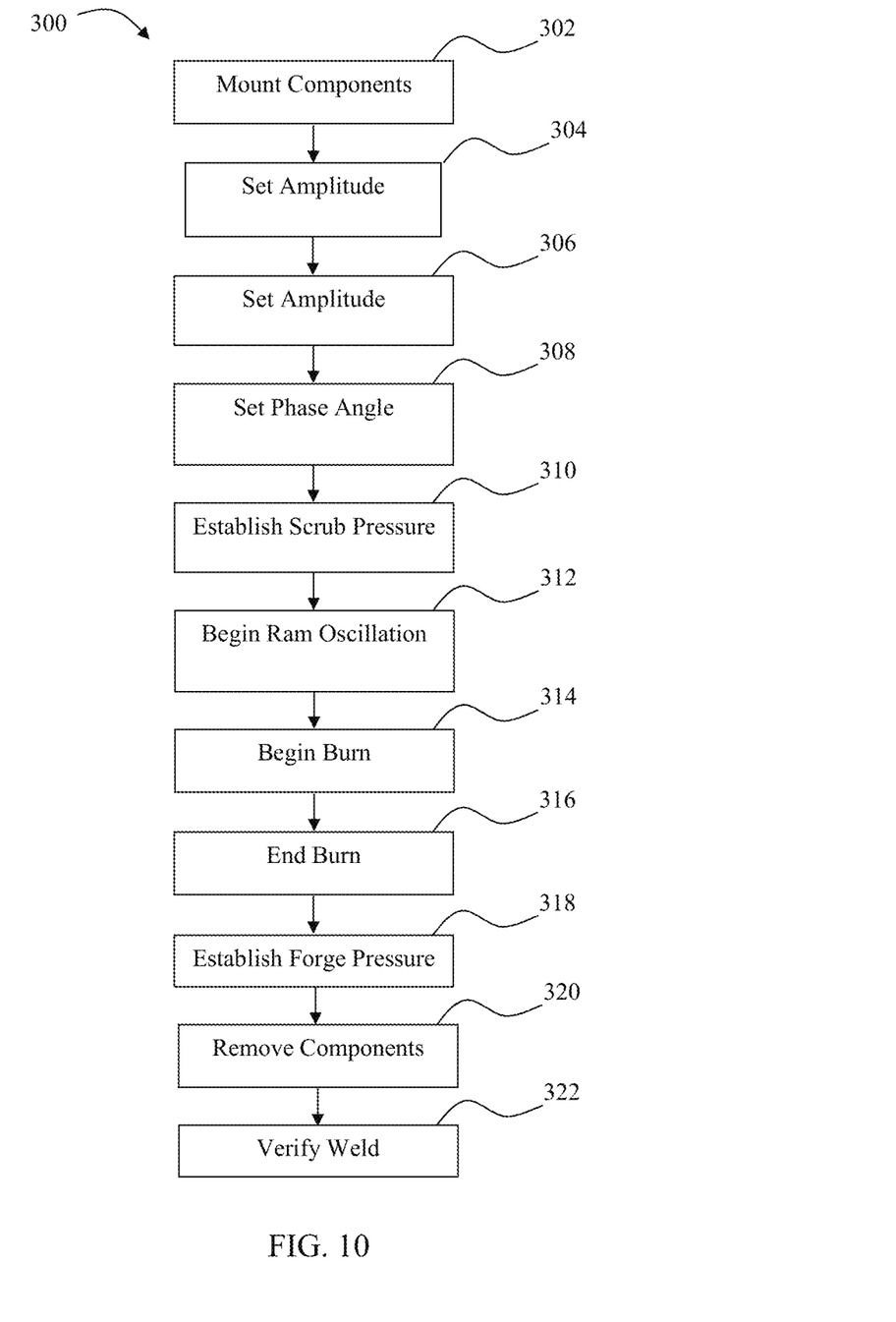
FIG. 10 depicts a procedure that can be executed under the control of the control system of FIG. 8 to form a welded unit with the linear friction welding system of FIG. 1.

Additional details of the linear friction welding system 100 are provided with reference to a method 300 in FIG. 10, portions of which are performed under the control the control system 230. At block 302, one of the components to be welded is mounted to the forge platen 120 and the other component is mounted to the carriage 118, although in some embodiments this is done later in the process. At block 304 the desired oscillation frequency is identified. Since the rotational speed of the motors 140/142 sets the oscillation frequency, in some embodiments, the motors 140 and 142 have a set speed which is selected based upon the particular components/materials to be welded. In other embodiments, one or more of the motors 140/142 have a variable speed capability, and parameters for the desired speed for the particular components/materials are stored in the parameter databases 240. In one embodiment, the motor 142 is controlled by a speed control while the motor 140 is controlled in a torque follower mode.

At block 306, the amplitude for the welding operation is established. In some embodiments, the amplitude is set simply by the selection of the eccentric 182 and the angular span of the slot 212 during the initial assembly of the system 100. In embodiments including a slot shim, the amplitude is optionally established by further selection of a slot shim which reduces the effective slot length.

Once the desired speed and amplitude are identified, the system phase angle is set to zero by controlling the motor 142 to the desired rotational speed using the desired control approach such as speed or direct torque control (block 308). The processing circuit 234 executes the program instructions 238 stored in the memory 236 to access the torque or speed setting for the motor 142 and to control the motor 142 based upon the obtained setting.

Under either speed or torque control, as the motor 142 rotates the inner power shaft 172 through the second power timing belt 176 and the second power timing gear 174, the inner power shaft 172 rotates the second slave timing gear 170. This forces the cross-over shaft 164 to be rotated through the second slave timing belt 168 and the second cross-over timing gear 166. Rotation of the cross-over shaft 164 causes the first slave timing gear 154 to rotate through the first cross-over timing gear 162 and the first slave timing belt 160.

Since the first slave timing gear 154 is rotatably supported on the outer power shaft 156, the first slave timing gear 154 causes the pin 214 to move in the direction of the arrow 220 in FIG. 7 into abutment with the end of the slot 212 in the trail position 216. The pin 214 forces the first power timing gear 154 to rotate thereby rotating the outer power shaft 156 at the same speed as the inner power shaft 172. Additionally, the motor 140 is rotated at the same speed as the motor 140 through the first power timing gear 154 and the first power timing belt 152. In torque follower control, this is ensured by setting the motor 142 to carry most of the load. As discussed above, the slot 214 and the eccentric 182 are configured such that when the pin 214 is in abutment with the end of the slot 212 in the trail position 216 the system phase angle is set to zero.

At block 310 the processing circuit 234 executes program instructions 238 to establish a scrub pressure between the components to be welded by control of the hydraulic press 122. The processing circuit 234 then shifts torque to the motor 140 at block 312 such as by modifying the torque control signal so that the motor 140 provides most of the torque or by simply shifting torque control from the motor 142 to the motor 140.

Regardless of the particular control philosophy, the result is that the motor 140 will force the outer power shaft 156 to rotate in the direction of the arrow 220 in FIG. 7 relative to the inner power shaft 172. This relative rotation continues until the pin 214 moves from abutment with the end of the slot 212 at the trail position 216 into abutment with the end of the slot 212 in the lead position 218. The relative movement of the outer power shaft 156 with respect to the inner power shaft 172 sets a non-zero system phase angle resulting in oscillation of the ram 146 with a frequency established by the speed of the motor 140.

In embodiments wherein torque control is shifted from the motor 142 to the motor 140 to effect the non-zero system phase angle, the rotational path described above from the motor 142 to the motor 140 is reversed and the motor 142 becomes a load for the motor 140.

Once the scrub pressure, scrub frequency, and scrub amplitude have been established, a scrub timer is started and counted down using a system clock or other appropriate clock. As the scrub is performed, a "wiping action" is generated by the linear friction welding system 100 as discussed more fully in the '039 patent.

When the desired scrub has been performed at block 312, burn parameters are established in the linear friction welding system 100 at block 314. Specifically, the processing circuit 234 controls the main hydraulic press 122 to achieve a desired burn pressure based upon a value stored in the parameters database 240. Since the motor 140 is providing most of the torque for the system at this stage, it will be appreciated that the motor 142 need not be as powerful as the motor 140. Accordingly, in some embodiments the motor 140 has a higher torque rating than the motor 142.

Once the burn pressure has been established, a burn timer is started and counted down using a system clock or other appropriate clock. During the burn, the processing circuit 234 obtains input from the sensor suite 242 and controls the main hydraulic press 122 to maintain the desired burn pressure.

When the burn timer has expired, movement of the ram 146 is terminated at block 316. Movement is terminated under the control of the processing circuit 234 by, e.g., transferring torque control back to the motor 142 or otherwise reversing the process which established the non-zero system phase angle so that a zero system phase angle is again established and the ram 146 no longer oscillates.

While the motors 140/142 rotate with no movement of the ram 146, the processing circuit 234 controls the main hydraulic press 122 to establish a forge pressure at block 318 between the two weld components based upon data stored in the parameters database 240. The forge pressure applied to properly burned components which are not moving with respect to one another welds the two components together into a welded unit.

Once the components have been welded, the welded unit is removed (block 320) and the weld verified (block 322). If desired, the processing circuit 234 may be used to determine the weld quality. Specifically, the initial position of the forge platen 120 as the two weld components came into contact can be stored and compared to the position of the forge platen 120 after a weld has been formed using the sensor 130. The difference between the two locations indicates a loss of material from the two components at the contact point of the two components.

Additionally, the temperature of the two components can be established, either by sensory input from the sensor suite 288 and/or by historic knowledge of the effects of the scrub and burn processes on the materials of the two components. Furthermore, the actual pressure, frequency, and amplitude of the procedure 300 provide precise information about the amount of energy placed into the components during the procedure 300. Consequently, the foregoing data may be used to calculate the amount of material lost due to flash and the nature of the weld formed.

The linear welding system 100 thus provides precise and independent control of pressure applied as well as the frequency and amplitude of oscillation during the procedure 300. The use of a torque transfer control reduces the complexity of the system required for operation compared to other methods. In addition, the pin and slot configuration of the first power timing gear and the first slave timing gear allows for the motors to remain on in between welds without movement of the ram.

While the present disclosure has been illustrated by the description of exemplary processes and system components, and while the various processes and components have been described in considerable detail, the applicant does not intend to restrict or in any limit the scope of the appended claims to such detail. Additional advantages and modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general inventive concept. By way of example, the slot and pin configuration can be established on the inner power shaft rather than the outer power shaft and the pin and slot arrangement can be reversed without altering the operation of the system.

The invention claimed is:

1. A cam assembly in a linear friction welding system, comprising:
   a first power shaft;
   a first timing gear mounted on the first power shaft and including a slot extending within the first timing gear, the slot formed as an arc about a center of rotation of the first power shaft;
   a second timing gear mounted on the first power shaft and including a pin fixedly connected to the second timing gear and extending into the slot;
   a cross-over shaft operably connected to the first power shaft;
   a second power shaft operably connected to the cross-over shaft;
   a third timing gear fixedly mounted to the second power shaft; and
   a fourth timing gear fixedly mounted to the second power shaft.

2. The cam assembly of claim 1, wherein the cross-over shaft is operably connected to the first power shaft through the second timing gear.

3. The cam assembly of claim 1, wherein the first timing gear is rotatably mounted to the first power shaft.

4. The cam assembly of claim 1, further comprising:
   at least one slot shim, the at least one slot shim configured to be removably attached to the first timing gear, and including body portion configured to fit within the slot so as to establish a desired length of the slot, the desired length of the slot associated with a desired oscillation amplitude of a ram of the linear friction welding system.

5. The cam assembly of claim 4, wherein;
   the at least one slot shim comprises a plurality of slot shims;
   each of the plurality of slot shims has a length that is different from a length of each of the other of the plurality of slot shims.

6. The cam assembly of claim 1, further comprising:
   a first timing belt; and
   a second timing belt, wherein:
   the cross-over shaft is operably connected to the first power shaft through the first timing belt; and
   the second power shaft is operably connected to the cross-over shaft through the second timing belt.

7. The cam assembly of claim 6, wherein the cross-over shaft is operably connected to the first power shaft through the second timing gear.

8. The cam assembly of claim 7, wherein the first timing gear is rotatably mounted to the first power shaft.

9. The cam assembly of claim 8, further comprising:
at least one slot shim, the at least one slot shim configured to be removably attached to the first timing gear, and including body portion configured to fit within the slot so as to establish a desired length of the slot, the desired length of the slot associated with a desired oscillation amplitude of a ram of the linear friction welding system.

10. The cam assembly of claim 9, wherein;
the at least one slot shim comprises a plurality of slot shims;
each of the plurality of slot shims has a length that is different from a length of each of the other of the plurality of slot shims.

\* \* \* \* \*